US012509925B2

(12) United States Patent
Inan et al.

(10) Patent No.: US 12,509,925 B2
(45) Date of Patent: Dec. 30, 2025

(54) MOTOR VEHICLE LOCK

(71) Applicant: KIEKERT AKTIENGESELLSCHAFT, Heiligenhaus (DE)

(72) Inventors: Ömer Inan, Dorsten (DE); Holger Schiffer, Meerbusch (DE); Michael Scholz, Essen (DE); Peter Szegeny, Engelskirchen (DE); Andreas Schmitz, Velbert (DE)

(73) Assignee: Kiekert AG, Heiligenhaus (DE)

( * ) Notice: Subject to any disclaimer, the term of this patent is extended or adjusted under 35 U.S.C. 154(b) by 37 days.

(21) Appl. No.: 18/699,611

(22) PCT Filed: Oct. 27, 2022

(86) PCT No.: PCT/DE2022/100798
§ 371 (c)(1),
(2) Date: Apr. 9, 2024

(87) PCT Pub. No.: WO2023/072346
PCT Pub. Date: May 4, 2023

(65) Prior Publication Data

US 2025/0223849 A1 Jul. 10, 2025

(30) Foreign Application Priority Data

Oct. 29, 2021 (DE) ..................... 10 2021 128 301.9

(51) Int. Cl.
*E05B 81/90* (2014.01)
*E05B 77/34* (2014.01)
(Continued)

(52) U.S. Cl.
CPC .............. *E05B 81/90* (2013.01); *E05B 77/34* (2013.01); *E05B 77/44* (2013.01); *E05B 79/20* (2013.01); *E05B 81/06* (2013.01); *E05B 81/14* (2013.01)

(58) Field of Classification Search
CPC .......... E05B 81/90; E05B 77/34; E05B 77/44; E05B 79/20; E05B 81/06; E05B 81/14
See application file for complete search history.

(56) References Cited

U.S. PATENT DOCUMENTS

2017/0204639 A1* 7/2017 Akahori .................. E05B 81/54
2018/0245379 A1* 8/2018 Taurasi .................. H05K 5/069
2019/0169886 A1 6/2019 Rosales

FOREIGN PATENT DOCUMENTS

DE 10151022 A1 2/2003
DE 69907356 T2 4/2004
(Continued)

OTHER PUBLICATIONS

International Search Report mailed Jan. 12, 2023, for priority International Application No. PCT/DE2022/100798.

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle lock, in particular a motor vehicle side door lock, comprising a locking mechanism with a rotary latch and at least one pawl, wherein the rotary latch can be blocked in at least one catch position by means of the pawl, an electrical drive unit for unblocking the locking mechanism, a lock housing with a wet chamber and a dry chamber, wherein the locking mechanism is arranged in the wet chamber and the drive unit is arranged in the dry chamber, and wherein at least one mechanical connection is arranged (Continued)

on the lock housing and protrudes into the dry chamber such that a mechanism arranged in the dry chamber can be actuated.

12 Claims, 2 Drawing Sheets

(51) Int. Cl.

*E05B 77/44* (2014.01)
*E05B 79/20* (2014.01)
*E05B 81/06* (2014.01)
*E05B 81/14* (2014.01)

(56) References Cited

FOREIGN PATENT DOCUMENTS

| | | | | |
|---|---|---|---|---|
| DE | 102006048026 A1 | 5/2007 | | |
| DE | 102008035534 A1 | 3/2009 | | |
| DE | 202012103608 U1 | 10/2012 | | |
| DE | 102015109494 A1 * | 12/2015 | ............. | E05B 81/54 |
| DE | 102019109488 A1 | 10/2020 | | |
| DE | 102020118721 A1 | 1/2022 | | |
| JP | 5495163 B2 | 5/2014 | | |

* cited by examiner

MOTOR VEHICLE LOCK

This application is a national phase of International Patent Application No. PCT/DE2022/100798 filed Oct. 27, 2022, which claims priority to German Patent Application No. 10 2021 128 301.9 filed Oct. 29, 2021, each of which is hereby incorporated herein by reference in its entirety.

FIELD OF DISCLOSURE

The invention relates to a motor vehicle lock, in particular a motor vehicle side door lock, comprising a locking mechanism with a rotary latch and at least one pawl, wherein the rotary latch can be locked in at least one catch position by means of the pawl, an electrical drive unit for unblocking the locking mechanism and a lock housing with a wet chamber and a dry chamber, wherein the locking mechanism is arranged in the wet chamber and the drive unit is arranged in the dry chamber.

BACKGROUND OF DISCLOSURE

In modern motor vehicle locking systems, locking mechanisms are primarily installed which catch with one another by the rotary latch and the pawl engaging with one another, therefore enabling a fixation of a component that is movably disposed on the motor vehicle. Depending upon the arrangement in the motor vehicle, single-catch or double-catch locking mechanisms are used. While it is more common to use single-catch locking mechanisms in covers or trunk lids, vehicle manufacturers are legally required to equip side doors, for example, with double-catch locking mechanisms. In a first catch, i.e., in a first catch position, also called a pre-catch, the side door is held loosely, and in a second catch, i.e., a second downstream catch position, also called a main catch, the side door is in a completely closed operating position.

In order to further increase comfort in motor vehicles, more and more electrically assisted functions are being used in the locking system. For this purpose, electric motors are, for example, installed in the locking systems and then enable, for example, electrical unblocking of the locking mechanism. The electric motor interacts with a gear mechanism, wherein the gear stage then indirectly or directly initiates the unblocking of the locking mechanism. Such an electrical drive unit is known from DE 10 2019 109 488.7.

In a locking system, at least the rotary latch is in direct engagement with a locking pin or lock holder. The rotary latch and lock holder interact in such a way that the rotary latch can be pivoted about the lock holder and blocks the rotary latch by means of the pawl. The rotary latch is thus exposed to environmental influences and can, for example, come into contact with water due to rain and/or with dust due to wind. In order to protect the other components of the motor vehicle lock from environmental influences, it is known to subdivide the motor vehicle lock into a wet chamber and a dry chamber, or a wet region and a dry region. Both terms are used as synonyms.

DE 20 2012 103 608 U1 discloses a motor vehicle lock in which the rotary latch is arranged in a wet region, referred to as the "outside" of the housing in this case, and the pawl is arranged in a dry region, referred to as the "inside" of the housing in this case, of the motor vehicle lock. Here, only a part of the pawl projects through an opening slot of the lock housing, wherein the width of the opening slot corresponds to the material thickness of the pawl. The catch arm of the pawl is thus the part of the pawl that protrudes into the wet region of the motor vehicle lock for engaging with the rotary latch.

DE 10 2020 118 721.1 describes an improvement of the aforementioned prior art in that an opening slot between the rotary latch and the pawl or the locking mechanism and the unblocking mechanism can be dispensed with. The document discloses an actuation lever and the unblocking of the locking mechanism, which actuation lever extends from a dry region toward the wet region. The actuation lever is pivotably accommodated, on the one hand, in a passage opening and, on the other hand, in a lock housing. The dry region and the wet region are separated by a housing wall, wherein the actuation lever passes through the passage opening. A seal is arranged in the region of the passage opening and is accommodated in a release lever and seals the dry region against the housing wall by means of a sealing lip. Due to the possibility of transmitting a torque from the dry region to the wet region in a sealed manner, it is possible here to arrange the drive unit in the dry region.

The known solutions above have proven successful in principle. Due to the increasing electrification of the locking system and the relocation of the drive units into the dry region, there is a need to also be able to mechanically access the drive unit arranged in the dry region. This is where the invention starts.

SUMMARY OF DISCLOSURE

One object of the invention is to provide an improved locking system. Furthermore, an object of the invention is to increase the safety in highly electrified locking systems and to be able to influence the drive units in the dry region.

According to the invention, the object is achieved by the features of independent claim 1. Advantageous embodiments of the invention are specified in the dependent claims. It should be noted that the exemplary embodiments described below are not restrictive; rather, any variation of the features described in the description and the dependent claims is possible.

In accordance with claim 1, the object of the invention is achieved in that a motor vehicle lock, in particular a motor vehicle side door lock, is provided, comprising a locking mechanism with a rotary latch and at least one pawl, wherein the rotary latch can be blocked in at least one catch position by means of the pawl, an electrical drive unit for unblocking the locking mechanism, and a lock housing with a wet chamber and a dry chamber, wherein the locking mechanism is arranged in the wet chamber and the drive unit is arranged in the dry chamber, and wherein at least one mechanical connection is arranged on the lock housing and protrudes into the dry chamber such that a mechanism arranged in the dry chamber can be actuated. The design according to the invention of the motor vehicle lock now creates the possibility of increasing the safety and thus the comfort for the operator of the motor vehicle. Due to the mechanical connection and the possibility of influencing the mechanism, safety-relevant functions in the motor vehicle lock can be actuated manually. If the entire electromechanical drive for unblocking the locking mechanism is arranged in the dry chamber of the housing of the motor vehicle lock, it is necessary for the electromechanical drive to function at any time and in any situation in order to unblock the locking mechanism. This can be problematic if, for example, environmental influences, such as heavy frost, and/or dirt in the locking mechanism itself and/or damage to the motor vehicle, impede unblocking of the locking mechanism. In this case, the electromechanical drive may not be sufficient to initiate unblocking of the locking mechanism. The design according to the invention and the mechanical connection now make it possible to influence the mechanism in the dry region. In this case, further functions, such as an anti-theft device, a child safety lock or a locking device, can also be influenced, to also name other influencing possibilities by way of example. Moving the mechanical connection into the dry chamber of the motor vehicle lock housing results in further advantages, which are explained in more detail below.

The lock housing is used for separating the wet chamber and the dry chamber, which lock housing can, on the one hand, hold or contain the electrical and/or electronic components and at the same time can be used for accommodating further components of the motor vehicle lock. The lock housing consists primarily of a housing part and a housing cover. Of course, the housing can also be made up of several parts and consist of two, three, or more housing parts. In order to implement the concept according to the invention, it is important that at least a portion of the functional mechanism of the motor vehicle lock be arranged in the dry chamber of the lock housing. The functional mechanism is not limited here but can relate to an unblocking mechanism, a locking device, an anti-theft device, a child safety lock, a closing aid, and/or similar functional devices in the motor vehicle lock. It is essential for the invention that a mechanical connection to the lock housing takes place, namely in such a way that the mechanism arranged in the dry region can be actuated by mechanically engaging in the dry region. Electric motors, control devices, circuit boards, and/or further electrically or electronic components are preferably arranged in the dry chamber.

A motor vehicle lock according to the invention is understood to also include such locks as are used in side doors, hatches, covers, or sliding doors, i.e., wherever components fastened movably to the motor vehicle must be fixed in a locking position in order to enable safe use of the motor vehicle. However, the motor vehicle lock according to the invention preferably relates to a motor vehicle side door lock.

The locking mechanism can be designed as a single-catch or double-catch locking mechanism. From the latest developments, locking mechanisms with rolling locking mechanism parts, such as a pivotable catch element, are also known. In the case of a single-catch locking mechanism, there is only one catch position in which the pawl holds the rotary latch. In the case of double-catch locking mechanisms, there is, in addition to a main catch position, also a pre-catch position such that the rotary latch and pawl can interact in two catch positions. In this case, a release lever interacts with the locking mechanism in such a way that the release lever disengages the caught locking mechanism. In this case, the pawl is moved out of the engagement region with the rotary latch. It is also known to use several pawls. For example, when an opening torque for the locking mechanism occurs in the main catch position, the pawl can be held via a further pawl. This further pawl is then referred to as a catch lever or blocking lever.

The electrical drive unit preferably consists of a DC motor, on the output shaft of which a gear wheel is mounted, which interacts with a further gear wheel in order to initiate a movement in the motor vehicle lock. It is conceivable that the gear wheel fastened to the electric motor be in direct engagement with an actuation lever; however, at least one gear stage is preferably arranged between the driving gear wheel and the actuation lever. The gear stage used is preferably a worm gear stage. The actuation lever can also interact directly with the release lever or be integrally formed as a release lever.

In one variant of the invention, the locking mechanism can be unblocked by means of the mechanical connection. The mechanical connection can be designed in such a way that a release lever can be actuated directly or indirectly. By means of the mechanical connection, it is thus possible to unblock the locking mechanism independently of the electrical drive unit. This provides the advantage that unblocking of the locking mechanism can also be ensured in extreme situations. An extreme situation can occur, for example, due to the locking mechanism freezing. In this case, the electrical drive unit could be unable to unblock the locking mechanism, such that an additional securing function can in turn be provided by the mechanical connection. The mechanical drive unit can act directly on the pawl, be connected to a release lever or act indirectly on a release lever.

A further advantageous variant of the invention results when an anti-theft device is arranged in the dry region and the anti-theft device can be actuated by means of the mechanical connection. An anti-theft device is present if an inner actuation means is additionally disabled in a locked locking system or motor vehicle lock. The anti-theft device prevents the inner actuation lever from being unlocked when the inner actuation lever or inner door handle is actuated. The arrangement of the anti-theft device in the dry chamber of the motor vehicle lock housing offers the possibility of being able to use the anti-theft mechanism further components of the motor vehicle lock outside the area of influence of the environment. It can also be advantageous here if the anti-theft device can be actuated electrically. In addition to the electrical drive unit for unblocking the locking mechanism, the electrically actuatable anti-theft device serves to disable a release mechanism for the locking mechanism. Due to the advantageous arrangement of the further electrical drive for actuating the anti-theft device, the electric motor can also be directly contacted by a circuit board arranged in the dry chamber, for example. The electrical or electronic components in the dry chamber can directly contact the electric motors arranged in the dry chamber without the electrical contacts needing to be protected from environmental influences. In order to protect, for example, electrical contacts on a microswitch, it is known that the contact points are potted in order to prevent corrosion in the region of the contact points. Such complex contact protection can be dispensed with by arranging the electric motors in the dry chamber.

In a preferred variant of the invention, the mechanical connection is formed from a Bowden cable. By means of a Bowden cable, for example, a mechanical outer door handle or an actuating socket in the outer door handle can be connected to the motor vehicle lock. The Bowden cable can thus directly access and actuate the mechanical functional devices in the dry chamber. It is conceivable, for example, for the Bowden cable to be fastened to a release lever such that the locking mechanism can be unblocked by means of the Bowden cable. Of course, the Bowden cable can also be connected to an inner actuation lever such that the locking mechanism can be mechanically locked by the inner door handle.

If the Bowden cable, in particular the Bowden cable sheath, is sealingly arranged on the lock housing, an advantageous variant of the invention can in turn be achieved. The Bowden cable sheath encloses the Bowden cable core and makes it possible to guide the Bowden cable core from, for example, an inner actuating door handle toward the lock housing. Depending on the position of the Bowden cable in the motor vehicle, the Bowden cable may also be located in a wet region of the motor vehicle. The sealing connection between the Bowden cable and the motor vehicle lock housing, and in particular the dry chamber, can ensure that the dry chamber is still protected. By connecting the Bowden cable sheath to the lock housing, sealing of the Bowden cable core can in this case be dispensed with. The Bowden cable sheath opens in the direction of the dry chamber such that environmental influences can remain disregarded. Separate sealing of the Bowden cable core is consequently not necessary. This is an advantage because corrosion and/or contamination in the Bowden cable can occur as a result of moisture entering the Bowden cable sheath, which in turn can prevent and/or completely limit the smooth movement of the Bowden cable core.

It can also be advantageous here if the lock housing is designed as a bearing point on the Bowden cable connection. The connection of the Bowden cable to the motor vehicle lock housing and in particular the connection to the dry chamber of the motor vehicle lock housing can consequently serve a dual function. On the one hand, a sealing connection can be established in the region of the connection and, on the other hand, the connection can serve as a bearing point for the Bowden cable sheath. The bearing point or fixed connection of the Bowden cable sheath to the lock housing then makes it possible to transmit a force to the dry chamber via the Bowden cable core.

If at least one further mechanical connection is arranged on the lock housing, wherein the further mechanical connection protrudes into the wet chamber, a mechanism arranged in the wet chamber can be actuated. Part of the lock mechanism can consequently be arranged in the wet chamber, while components of the lock mechanism can likewise be arranged in the dry chamber. In particular, the components to be protected from environmental influences, such as electric motors, electrical lines and/or components, can thus be protected from environmental influences. The actuation lever is advantageously actuated through the lock housing, wherein a sealing connection from the dry chamber to the wet chamber has proven to be advantageous. By transmitting the torque for unblocking the locking mechanism through a passage opening in the lock housing, the dry chamber can be reliably protected from penetrating environmental influences. The locking mechanism and, for example, a closing drive can act on the locking mechanism via the further Bowden cable.

The further mechanical connection can also be a Bowden cable. It is also conceivable that two and more Bowden cables are arranged on the lock housing, which are then connected to the dry chamber or wet chamber depending on the position of the mechanisms in the motor vehicle lock. In particular, the mechanisms and/or electrically actuated functional units in the motor vehicle lock which are associated with the dry chamber can then be used in a manner that is reliably protected from environmental influences. In this case, mechanisms or electrical mechanisms that describe functions of the lock, for example locking, unblocking, child safety locking, anti-theft securing, closing, querying, or the like are referred to as functional units or mechanical functions in the motor vehicle lock.

The design according to the invention of the motor vehicle lock allows a mechanical engagement in the dry chamber of the motor vehicle lock. The relocation of a function, for example the function of an anti-theft device, into the dry chamber offers the advantage that the electrical connection can be established without additional securing measures and that the mechanism arranged in the dry chamber is not subject to any environmental influences. Furthermore, the sealing bearing and connection of the Bowden cable on and to the lock housing is also simplified, which has a positive effect on the overall costs of the motor vehicle lock.

BRIEF DESCRIPTION OF DRAWINGS

In the following, the invention is explained in more detail with reference to the accompanying drawings on the basis of exemplary embodiments. However, the principle applies that the exemplary embodiments do not limit the invention but are merely advantageous embodiments of the invention. The features shown can be implemented individually or in combination with further features of the description as well as the claims-individually or in combination.

In the drawings.

DETAILED DESCRIPTION

Figure 1:
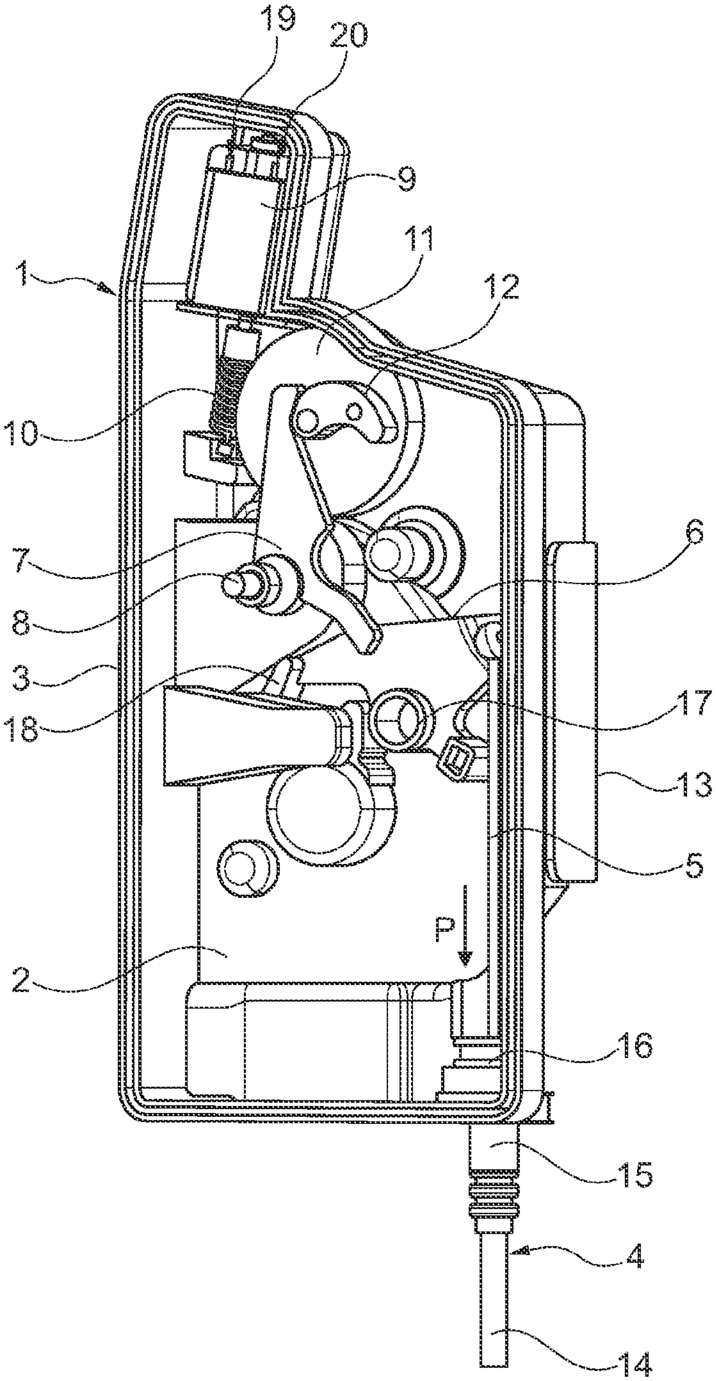
FIG. 1 shows a three-dimensional plan view of a motor vehicle lock designed according to the invention without a housing cover and with a Bowden cable arranged in the dry chamber.

FIG. 1 shows a motor vehicle lock 1 in a plan view and without a lock housing cover, wherein the dry chamber 2 is shown, and wherein only the components of the motor vehicle lock 1 that are essential for explaining the invention are represented. A Bowden cable 4 is connected to the motor vehicle lock housing 3, wherein the Bowden cable is connected by a Bowden cable core 5 to a lever 6 pivotably mounted in the motor vehicle lock housing; the lever 6 can, for example, be an outer actuation lever or an inner actuation lever. The lever 6 acts on an actuation lever 7 and is able to move the actuation lever 7 counterclockwise through a clockwise pivoting movement of the lever 6. The actuation lever 7 is in turn accommodated in the motor vehicle lock 1 so as to be pivotable about an axis 8. By means of the actuation lever 7, a release lever arranged in the wet chamber (not shown) can, for example, be actuated. Furthermore, an electric motor 9 can be seen, which drives a worm gear wheel 11 via a worm 10. A control contour is arranged on the worm gear wheel 11, by means of which control contour the actuation lever 7 can be pivoted counterclockwise. The actuation lever 7 can rest against the control contour 12 in a spring-loaded manner.

The motor vehicle lock housing 3 is enclosed at least on two sides by a lock plate 13; at least the locking mechanism is usually mounted in the lock plate 13. In addition, the lock plate 13 can have an extension which forms a bearing point for the Bowden cable 4 in the motor vehicle lock 1.

Further electrical and electronic components and also a circuit board can be installed in the interior of the motor vehicle lock, and in particular in the dry chamber 2. For example, a microswitch can be arranged on a circuit board, and the position of the lever 6, of the actuation lever 7, of the worm gear wheel, and/or the control contour 12 can be queried. Of course, this list is not limiting. Rather, further components that comprise further functions of the motor vehicle lock 1 and/or are designed as electrical components can be arranged in the dry chamber 2.

The Bowden cable 4 has a Bowden cable sheath 14 and is sealingly accommodated in the motor vehicle lock housing 3. A plastics sleeve 15 can seal the Bowden cable 4 and in particular the Bowden cable core 5 against environmental influences. In addition, the motor vehicle lock housing 3 has a bearing point for the Bowden cable 4 such that an abutment for actuating the Bowden cable core 5 can be provided by the motor vehicle lock housing 3. By actuating the Bowden cable 4 or the Bowden cable core 5, the lever 6 is pivoted clockwise about its axis 17, wherein an entrainer 18 on the lever 6 comes into engagement with the actuation lever 7 and thus allows the locking mechanism to be unblocked. In order to unblock the locking mechanism, the electric motor 9 can also be actuated, whereby the actuation lever 7 is again pivoted counterclockwise via the worm 10 and the worm wheel 11 and the control contour 12 in order to unblock the locking mechanism.

The electric motor 9 has electrical contacts 19, 20 which, for example, can be supplied with electrical power by means of a circuit board. The electrical contacts 19, 20 do not have to be protected separately, since the electric motor itself and the points of contact 19, 20 are located in the dry chamber 2.

Figure 2:
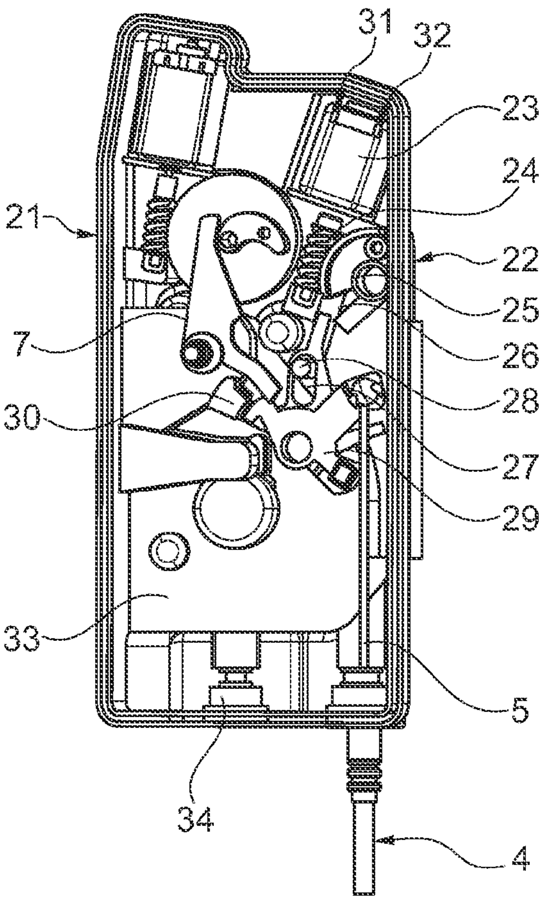
FIG. 2 shows a plan view of an alternative embodiment of a motor vehicle lock without a housing cover and with an integrated anti-theft device.

FIG. 2 shows an alternative embodiment of a motor vehicle lock 21. Identical components are provided with the same reference signs. In addition, the motor vehicle lock 21 has an anti-theft device 22. A worm 24 is actuated by means of an electric motor 23, wherein the worm 24 meshes with a worm wheel segment 25. An adjustment lever can be displaced and an anti-theft device 22 can be engaged by means of the worm wheel segment 25. The decoupled state is shown in FIG. 2. For this purpose, the adjusting lever 26 is linearly guided in an opening 27. The adjusting lever 26 serves as a coupling element, wherein a cylindrical extension 28 on the adjusting lever 26 causes coupling into the lever 29 such that the lever 29 comes into engagement with the cylindrical extension 28 and can pivot the driver 30. The driver is arranged on a separate lever mounted pivotably in the motor vehicle lock housing 3 and can be actuated by the lever and the cylindrical extension 28. Pulling on the Bowden cable 4 or the Bowden cable core 5 thus causes the lever 29 to pivot and, when the anti-theft device 22 is disengaged, the driver 30 to be actuated such that the actuation lever 7 can be pivoted counterclockwise.

An advantage of the design according to the invention of the motor vehicle lock 21 is shown here, namely that the electrical points of contact 31, 32 of the electric motor 23 can in turn be arranged in the dry chamber 33, whereby the electrical contacts 31, 32 and/or further microswitches and/or a further control line or supply line are also protected from weather influences.

In FIG. 2, a further bearing point for accommodating a further Bowden cable is also provided, with which a lock mechanism in the dry chamber 3 can be actuated, for example.

Figure 3:
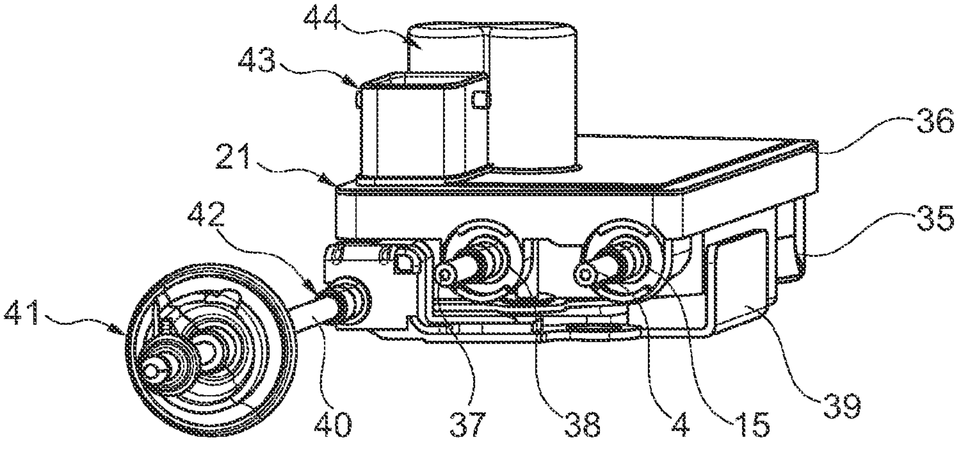
FIG. 3 shows a three-dimensional view of the closed motor vehicle lock according to FIG. 2.

FIG. 3 is a three-dimensional view of the completed motor vehicle lock 21. The motor vehicle lock housing 35 and a lock housing cover 36, which seals the dry chamber 33, can be seen. A first Bowden cable 4 can serve to actuate an inner actuation lever 29 and a further Bowden cable 37 can serve to actuate a locking device. The Bowden cables 4, 37 are connected to the motor vehicle lock housing by means of a plastics sleeve 15, 38 such that a sealing connection of the Bowden cables 4, 37 to the motor vehicle lock housing 35 is enabled. A lock case 39 encloses the motor vehicle lock housing 35 and simultaneously serves as a bearing point for a further Bowden cable 40. The further Bowden cable 40 can be part of a closing device 41, for example. The closing device then engages in the wet region of the motor vehicle lock 21 and is able to transfer the locking mechanism from a pre-catch position into a main catch position. In order to be able to absorb large forces, the bearing point 42 for the closing device 41 is formed by the lock case 39.

A plug socket 43 is also arranged on the lock housing cover 36, and the lock housing cover 36 encloses electrical components 44 in the interior of the dry chamber 33 at the same time.

The design according to the invention of the motor vehicle lock now creates the possibility of also manually actuating mechanical functions in the dry chamber of a motor vehicle lock 1, 21. As a result, not only is the connection of the Bowden cables 4, 37, 40 simplified, since only minor sealing measures are necessary, but the advantage also arises that the electrical, electronic and mechanical components can be accommodated in the motor vehicle lock 1, 21 irrespective of environmental influences.

LIST OF REFERENCE NUMBERS

1, 21 Motor vehicle lock
2, 33 Dry chamber
3, 35 Motor vehicle lock housing
4, 37, 40 Bowden cable
5 Bowden cable core
6, 29 Lever, outer actuation lever, inner actuation lever
7 Actuation lever
8, 17 Axis
9, 23 Electric motor
10, 24 Worm
11 Worm gear wheel
12 Control contour
13, 39 Lock plate, lock case
14 Bowden cable sheath
15, 38 Plastics sleeve
16, 34, 42 Bearing point
18, 30 Entrainer
19, 20, 31, 32 Electrical contacts
22 Anti-theft device
25 Worm wheel segment
26 Adjusting lever
27 Opening
28 Cylindrical extension
36 Lock housing cover
41 Closing device
43 Plug socket
44 Electric components
P Arrow

The invention claimed is:

1. A motor vehicle lock comprising:
- a locking mechanism including a rotary latch and at least one pawl, wherein the rotary latch is blocked in at least one catch position by the at least one pawl,
- an electrical drive unit that is operable for unblocking the locking mechanism,
- a lock housing with a wet chamber and a dry chamber, wherein the locking mechanism is arranged in the wet chamber and the electrical drive unit is arranged in the dry chamber,
- at least one mechanical connection that is arranged on the lock housing and protrudes into the dry chamber,
- an actuatable mechanism arranged in the dry chamber that is actuated via the mechanical connection, at least one further mechanical connection that is arranged on the lock housing and protrudes into the wet chamber, and another actuatable mechanism arranged in the wet chamber that is actuated via the further mechanical connection.

2. The motor vehicle lock according to claim 1, wherein the locking mechanism is unblocked by operation of the mechanical connection.

3. The motor vehicle lock according to claim 1, wherein the actuatable mechanism comprises an anti-theft device that is arranged in the dry chamber, and the anti-theft device is actuated by operation of the mechanical connection.

4. The motor vehicle lock according to claim 3, wherein the anti-theft device is actuated electrically.

5. The motor vehicle lock according to claim 1, wherein the mechanical connection includes a Bowden cable.

6. The motor vehicle lock according to claim 5, wherein the mechanical connection includes a Bowden cables heath that receives the Bowden cable and the Bowden cable sheath is sealingly arranged on the lock housing.

7. The motor vehicle lock according to claim 5, wherein the lock housing includes a bearing point for receiving the Bowden cable.

8. The motor vehicle accordingly to claim 7, wherein the bearing point comprises a sealed connection between the wet chamber and the dry chamber.

9. The motor vehicle lock according to claim 5, wherein two or more Bowden cables are connected to the lock housing.

10. The motor vehicle lock according to claim 9, wherein at least one of the two or more Bowden cables extends into the dry chamber and least one of the two or more Bowden cables extends into the wet chamber.

11. The motor vehicle lock according to claim 1, wherein the further mechanical connection is a Bowden cable.

12. A motor vehicle lock comprising:

a locking mechanism including a rotary latch and at least one pawl, wherein the rotary latch is blocked in at least one catch position by the at least one pawl, an electrical drive unit that is operable for unblocking the locking mechanism, a lock housing with a wet chamber and a dry chamber, wherein the locking mechanism is arranged in the wet chamber and the electrical drive unit is arranged in the dry chamber, at least one mechanical connection that is arranged on the lock housing and protrudes into the dry chamber, and an actuatable mechanism arranged in the dry chamber that is actuated via the mechanical connection, wherein the mechanical connection includes a Bowden cable, wherein two or more Bowden cables are connected to the lock housing, and wherein at least one of the two or more Bowden cables extends into the dry chamber and least one of the two or more Bowden cables extends into the wet chamber.

* * * * *